United States Patent

[11] 3,622,248

| [72] | Inventors | David B. Scott, deceased<br>late of Walton, N.Y.;<br>National Bank and Trust Company of<br>Norwich, executor, 52 South Broad St.,<br>Norwich, N.Y.; Dale E. Willhite, executor,<br>322 Page St., Apt. A-10, Norman, Okla.<br>73069 |
|---|---|---|
| [21] | Appl. No. | 871,815 |
| [22] | Filed | Aug. 11, 1969 |
| [45] | Patented | Nov. 23, 1971 |

[54] ADJUSTABLE DRILLING APPARATUS
18 Claims, 11 Drawing Figs.

[52] U.S. Cl. .................................................... 408/188,
145/127
[51] Int. Cl. ................................................. B23b 51/00
[50] Field of Search ............................................ 175/263,
279, 273; 77/67, 58 F, 58 M, 75; 145/124, 127

[56] References Cited
UNITED STATES PATENTS

| 1,436,826 | 11/1922 | Schmidt ...................... | 77/75 UX |
| 3,203,493 | 8/1965 | Bergstrom .................. | 77/67 UX |

FOREIGN PATENTS

| 14,158 | 1888 | Great Britain................ | 145/124 |

*Primary Examiner*—Francis S. Husar
*Attorney*—Richard G. Stephens

ABSTRACT: An adjustable drill comprising a rotatable barrel having a first arm rigidly extending therefrom to symmetrically locate a first cutting tool on a drilling axis, a second rigid arm pivotally mounted on the first arm intermediate the barrel and the first cutting tool, with a second cutting tool mounted adjacent one end of the second arm, the other end of the second arm comprising a gear segment which meshes with a worm gear carried inside the barrel, so that rotation of the worm gear varies the angle between the arms and thereby varies the diameter of the hole which is drilled.

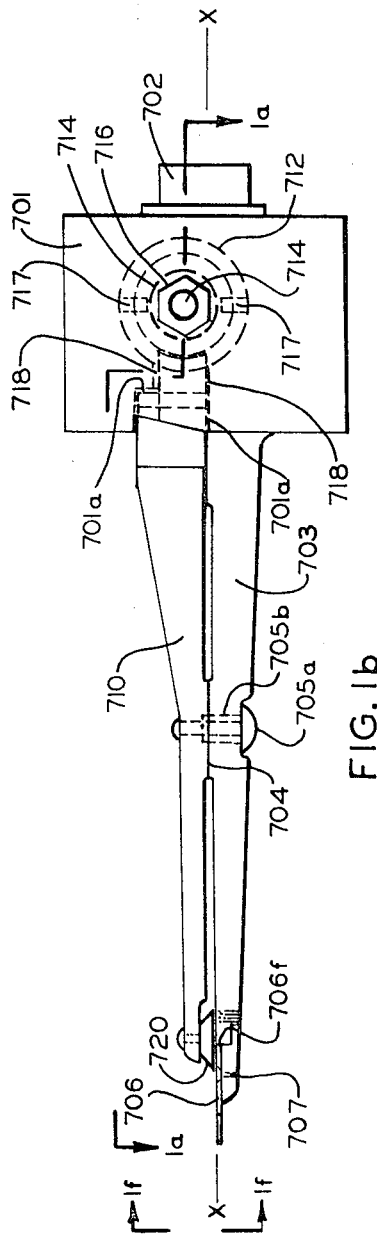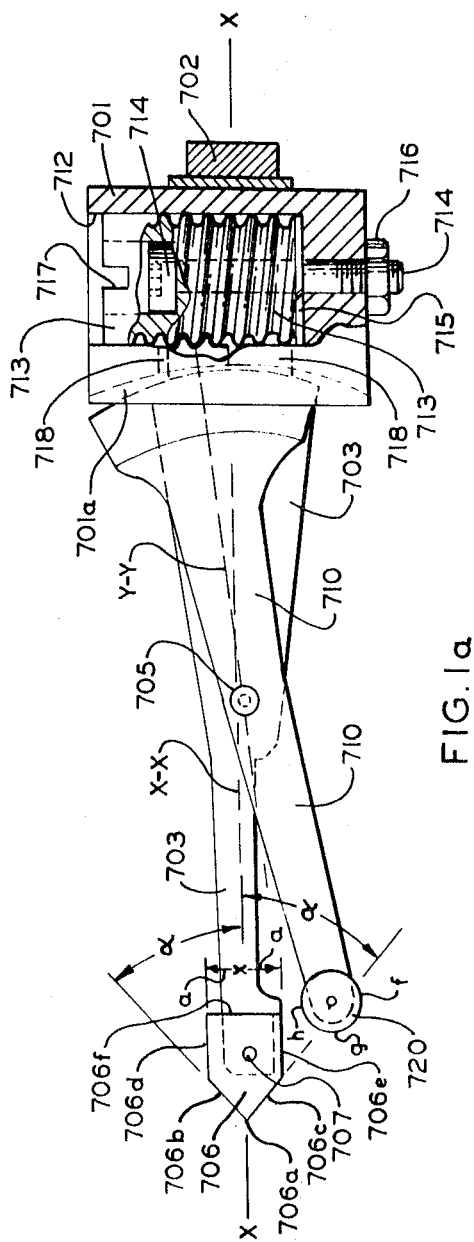
INVENTOR.
DAVID B. SCOTT
BY.
Richard G. Stephens

ADJUSTABLE DRILLING APPARATUS

This invention relates to an adjustable drill tool which may be easily and rapidly adjusted to drill holes having any one of a large number of different diameters. A large number of manufacturing and like operations require that a given machine be used to drill successive holes having different diameters. It has been perhaps most common in the prior art to provide such a machine with a chuck and a large number of drill bits of different diameters. A practical adjustable-diameter drill tool which can be adjusted to drill a hole of any desired diameter without taking it out of the machine, and without the need to substitute a selected one of a large number of separate pieces, offers great advantages over that prior art arrangement in that it obviates the need for a chuck, and obviates the need to procure and store a large number of pieces, thereby offering significant economies, as well as obviating workpiece spoilage or tool damage which frequently results when unskilled persons improperly align a drill bit within a Jacobs chuck, or obviating the problems of drill loosening and drill sticking which frequently attend the use of taper-shank drill bits. The use of an adjustable drill is especially advantageous where drilling machines are operated by unskilled personnel, as it obviates workpiece spoilage due to selection of a wrong bit size, and an adjustable drill bit, if made readily and accurately adjustable, can considerably reduce the time required to accomplish a given drilling task. The drill of the present invention, while conceived in connection with apparatus for drilling finger and thumb holes in bowling balls, is readily applicable to a wide variety of diverse applications, and may be used to drill holes in many different materials, including hard rubber, various plastics, wood, and various metals.

One object of the invention is to provide a drill tool which can be easily adjusted to drill a large number of different sizes of holes. Another object is to provide an adjustable drill tool which may be rapidly and easily adjusted from one hole size to another hole size with a minimum of effort. A further object is to provide a drill tool which the operator need not lock in a given position but which will not become misadjusted in use. Another object is to provide an adjustable drill which will not tend to move sideways when it first engages a workpiece. Still another object is to provide an adjustable drill tool which may be set to any one of a number of hole size conditions with good repeatability. A further object is to provide an adjustable drill tool which is rugged and reliable, and simple and economical to manufacture.

Other objects of the invention will in part be obvious and will, in part, appear hereinafter.

The invention accordingly comprises the features of construction, combination of elements, and arrangement of parts, which will be exemplified in the constructions hereinafter set forth, and the scope of the invention will be indicated in the claims.

For a fuller understanding of the nature and objects of the invention, reference should be had to the following detailed description taken in connection with the accompanying drawings, in which:

FIG. 1a is a top view of an adjustable drill according to the invention, with certain portions cutaway as indicated in FIG. 1b, FIG. 1a being a view taken at lines 1a—1a in FIG. 1b.

FIG. 1b is a side view of the drill of FIG. 1a.

FIG. 2b is a view taken at lines 2b—2b in FIG. 2a.

Figure 1C:
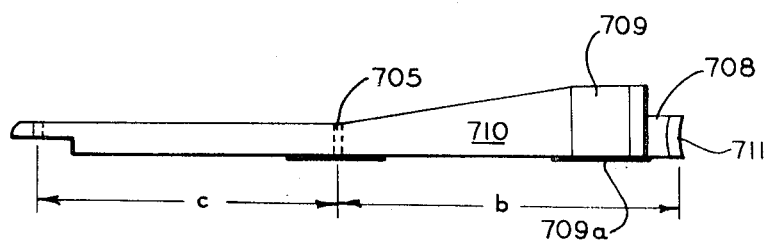
FIG. 1c is a side view of pivot arm 710 of the drill.

The adjustable-diameter drill shown in FIGS. 1a and 1b comprises a cylindrical barrel 701 having a concentric integral shaft portion 702 extending rearwardly therefrom, and a rigid forwardly extending arm 703 formed integrally with barrel 701 and stationary relative thereto. Shaft portion 702 may be engaged by a conventional chuck (not shown), may be threaded externally to screw into a hollow internally threaded drive spindle, or may be provided with a threaded internal bore to receive an externally threaded drive spindle. Either of the latter arrangements advantageously eliminates the need for a chuck. Stationary arm 703 is provided with a flat surface 704 and pivot pin 705a intersects surface 704 close to, and preferably at, the longitudinal axis x–x of the assembly, which corresponds to the central axis of shaft 702. A hardened (e.g., carbide) cutter 706 fastened by flat-head hex-socket screw 707 to the end of stationary arm 703 has its tip 706a (FIG. 1a) aligned with axis x–x, retreating cutting edges 706b, 706c which extend rearwardly each preferably at the same angle (α) relative to axis x–x, and cylindrical piloting edges 706d, 706e which extend parallel to axis x–x, at the same radial distance (a) from axis x–x. The rear edge 706f (FIG. 1b) of cutter 706 abuts a flat edge on arm 703 so that cutter 706 is constrained against rotation and its edges 706d, 706e are fixed parallel to axis x–x.

Figure 1D:
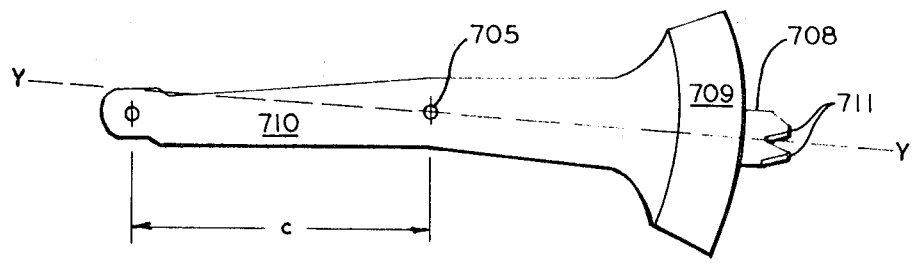
FIG. 1d is a top view of the pivot arm of FIG. 1c.
Figure 1E:
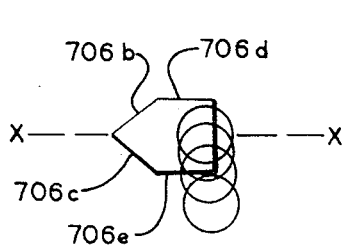
FIG. 1e is a diagram useful in illustrating the relative positions of two cutters of the drill at different hole-diameter positions.
Figure 1F:
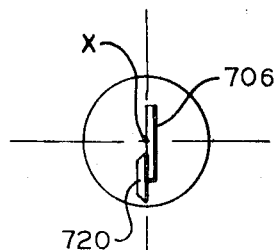
FIG. 1f is a view taken at lines 1f—1f in FIG. 1b.
Figure 1G:
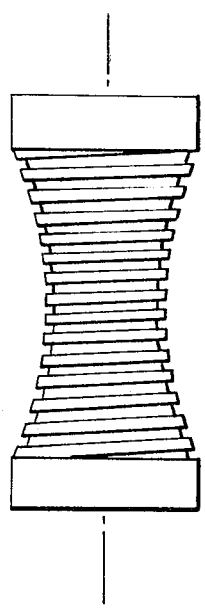
FIG. 1g illustrates a modified form of worm gear which may be used in various alternative embodiments of the invention.

Pivotally attached to stationary arm 703 by screw 705a and bushing 705b is movable . 710, two views of which are shown in FIGS. 1c and 1d. Pivot arm 710 includes at its rear end an arcuate pad 709 from which there extends rearwardly an arcuate rack or gear tooth portion 708 (shown as having only two teeth 711, 711 in FIG. 1d) with a pitch circle approximately equal to distance b in FIG. 1c. A transverse bore 712 extending partially through barrel 701 rotatably carries worm gear 713, which is retained in bore 712 by means of screw 714, spring washer 715 and nut 716. Though shown as having many turns in FIG. 1a, worm gear 713 frequently will have only one full turn of thread per tooth of gear segment 708 and rotation of the worm will be limited, to 360°, for example. In various alternative embodiments of the invention worm gear may have many turns, and will be rotated through plural turns in order to adjust the hole size. The round head of screw 714 is shown recessed in worm 713 and the outer end of worm 713 is provided with slots 717, 717 by means of which the worm may be rotated using a screwdriverlike tool, or alternatively and preferably, an adjusting dial mechanism to be described. An arcuate slot 701a in the front face of barrel 701 accommodates arcuate pad 709 of arm 710, and an open passage 718 extending between slot 701a and bore 712 accommodates gear tooth portion 708, so that teeth 711, 711 mesh with worm 713. With worm 713 axially fixed in bore 712 by screw 714, it will be seen that rotation of worm 713 will pivot movable arm 710 about pivot 705, thereby adjusting the angle between arms 703 and 710, thereby adjusting the radial distance of the outer end of arm 710 by drill axis x–x, and thereby adjusting the diameter of the hole which will be drilled. It will be seen in FIG. 1a that one side of gear tooth portion 708 will eventually strike one end of slot 718 when the worm is rotated in one direction, and that the other side of gear tooth portion 708 will eventually strike the other end of slot 718 where the worm is rotated in the opposite direction, and hence the ends of slot 718 operate as stop means which limit the pivoting of movable arm 710 relative to arm 703. In FIG. 1a movable arm 710 is shown adjusted to an extreme outward position, beyond the usual outward limit operating position, for convenience of illustration. Movable arm 710 also carries a hardened cutter 720 fastened to its outer end with cutter 720 preferably having the shape of a truncated cone, as shown in FIG. 1b. While FIG. 1b shows a small gap between cutters 706 and 720 for clarity of illustration, the two cutters are in practice dimensioned so that the inner flat face of cutter 720 is clamped fairly tightly against the inner flat face of cutter 706. In usual use of the drill arm 710 is not swung so far away from arm 703 that the upper (in FIG. 1a edge of cutter 720 lies away from the drill axis by any more than dimension a. FIG. 1e diagrammatically illustrates movable cutter 720 at four different positions relative to fixed cutter 706. In the uppermost position shown in FIG. 1e within cutter 720 lies radially within edges 706d, 706e it will be apparent that cutter 720 will not be operative, the diameter of the minimum-diameter hole drilled will correspond to 2a, the width of cutter 706, and the hole will have straight sides and terminate in a conical bottom determined by edges 706l and 706c of cutter 706. If worm 713 is adjusted to pivot movable arm 710 away from fixed arm 703, the diameter of the drilled hole apparently will increase and a portion of the bottom of the drilled hole will be arcuate, shaped in accordance with the profile of cutter 720. In one exemplary embodiment of the invention worm 713 was provided with 16 pitch, double-thread, 14½° pressure angle, with 0.3927-inch lead, so that 360° rotation of worm 713 moved a point on the pitch circuit of gear segment 708 a distance of approximately 0.3927 inch, and distance $b$ (FIG. 1C) was approximately 2.50 inches. Cutter 720 is preferably positioned on movable arm 710 relative to $y$–$y$ (FIG. 1d) centerline which extends between pivot point 705 and between teeth 711, so that the outer edge of cutter 720 (point $f$ in FIG. 1a) will be at the middle of the range of hole sizes to be drilled when centerline $y$–$y$ coincides with axis $x$–$x$. Then rotation of worm 713 in one direction or the other displaces axis $y$–$y$ from axis $x$–$x$ in one direction or the other, thereby increasing or decreasing the size of the hole which will be drilled. As arm 710 is pivoted away from its centered mid-range position at which axis $y$–$y$ is aligned with axis $x$–$x$, gear teeth 711 will be seen to move very slightly outwardly from and mesh slightly less with the threads on worm 713, theoretically tending to provide somewhat greater play or backlash at greater diameter positions. The change in the mesh between the gear teeth and the worm will be seen to vary basically in accordance with the cosine of the angle between axes $x$–$x$ and $y$–$y$, and if the maximum angle between the axes is kept small (e.g., ±5°). The increase in backlash will be negligably small. The number and shape of teeth on worm 713, the lead of such teeth, the shape of the teeth 711, and radii $b$ and $c$ (FIG. 1c) may readily be selected cthat change in tooth engagement does not create appreciable backlash at the minimum and maximum hole size positions. In modified forms of the invention in which much larger deviations of axis $y$–$y$ from axis $x$–$x$ are provided to allow a greater range of hole sizes to be drilled, worm 713 may be provided with a varying diameter, if desired, as indicated in exaggerated form in FIG. 1g, and worm 713 may be rotated through many full turns to vary the size of the hole to be drilled.

With movable arm 710 adjusted to a given position, as the drill is advanced toward the workpiece, it will be seen that the tip of cutter 706 will first engage the work, and because the tip of the cutter lines on the drill axis of rotation $x$–$x$ there is no tendency for the drill to escape from a centerpunch mark or the like and "walk" sideways as the workpiece is initially engaged. By the time cutter 720 engages the workpiece, cutter 706 will have drilled a cylindrical hole in the workpiece and be substantially entirely seated within the hole, thereby establishing the center of the circular path which cutter 720 will trace on the workpiece.

It is extremely important, of course, that reaction forces applied to cutter 720 by the workpiece not cause movable arm 710 to pivot about pin 705 while the drill is being advanced and a hole is being drilled. Because of the great gear reduction which may be provided by worm 713, the friction with which screw 714 and spring 715 hold worm 713 in place within bore 712 may be quite small, so that worm 713 is easily adjustable by means of slots 717, with that friction, plus the friction between cutters 706 and 720 and the friction between surfaces 701a and 709a (FIG. 1c) still being quite adequate to prevent drilling forces imparted to arm 710 from rotating the worm, so that no further means are required to lock the drill at a desired diameter position. Obviating the need for further locking means is a particularly important advantage in applications where drilling is done by relatively unskilled personnel. Rendering the worm gear easily adjustable by means of slots 717 is especially desirable in applications where machine adjustment is to be done by persons of lesser strength, such as women.

When the drill is adjusted to a position so that only a small (lower in FIG. 1a) edge portion of cutter 720 lies radially outside dimension 2, as where a hole only slightly larger than minimum diameter is being drilled, it will be seen that a relatively small reaction force will tend to rotate arm 710 clockwise in FIG. 1a, but when holes of increasing diameter are drilled, more of the edge of cutter 720 will engage the workpiece, providing greater reaction forces. It is a feature of the invention that as cutter 720 is adjusted outwardly, and as more than 90° of the edge of tool 720 engages the work, reaction forces on arm 710 begin to cancel each other, thereby further diminishing the need for great friction in order to prevent misadjustment. As cutter 720 is moved to such greater diameter positions, it will be seen that the portion of work engaging cutter 720 anywhere between points $g$ and $h$ in FIG. 1a will tend to urge cutter 720 in an opposite direction from the forces from the work engaging cutter 720 between points $f$ and $g$ in FIG. 1a, thereby tending to diminish or cancel the latter.

Figure 2A:
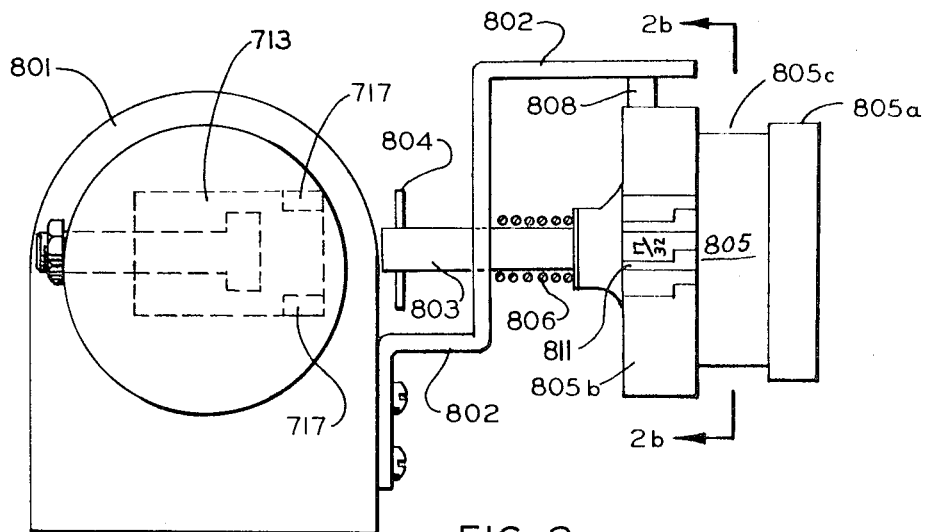
FIG. 2a is a side view of a drill adjusting mechanism which may be used to manually adjust the drill to one of many selected hole sizes.
Figure 2B:
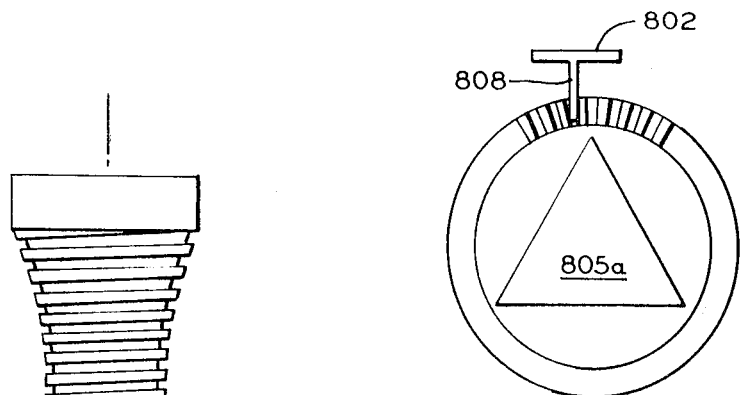

In FIG. 2a, the adjustable drill is shown mounted in place in a machine headstock 801. A bracket 802 fixedly attached to headstock 801 carries a rotatable and reciprocable shaft 803 having a transverse pin 804 mounted adjacent its inner end and a control knob 805 affixed to its outer end. Compression spring 806 situated between knob 805 and bracket 802 urges knob 805 and shaft 803 outwardly. Collar portion 805b of knob 805 is provided with a plurality of slots, a slot being provided for each predetermined or specified hole diameter to which the drill is to be adjusted. Each slot has a narrow width at the front edge of collar 805b and a greater width at the rear edge of the collar, thereby providing an intermediate edge or face in a plane normal to the axis of shaft 803. The slot associated with one hole size (marked 17/32) is shown at 811 in FIG. 2a. A blade 808, depending from bracket 802 engages the slot associated with a given hole size when the drill is adjusted to that hole size in a manner to be explained. In order to adjust the drill it is first rotated, by hand (such as by twisting the rear end of the headstock shaft or the drive motor shaft, neither of which are shown in FIG. 2a) to horizontally align the axis of worm 713 with the axis of shaft 803. Then by pushing on triangular outer portion 805a of control knob 805, shaft 803 may be translated leftwardly as viewed in FIG. 2a, until the ends of pin 804 engage slots 771, 717 of worm gear 713. The translation of knob 805 and shaft 803 also causes plate 808 to enter groove 805c and clear the slots in collar 805b, thereby allowing control knob 805 to be rotated. Knob 805 may be rotated so as to position any desired slot in line with plate 808. Then as pressure on the control knob is relaxed, spring 806 moves knob 805 and shaft 803 rightwardly, thereby causing pin 804 to be retracted from slots 717, 717 of worm gear 713 and simultaneously causing blade 808 to enter the widened rear end portions of the selected pair of slots. Before the axis of pin 804 is entirely removed from worm gear slots 717, the front edge of plate 808 reaches the intermediate face of the selected slot in collar 805b. The control knob is always rotated clockwise (in FIG. 2b) as it is released, and it will be seen that the left edge of plate 808 will first engage the intermediate face of the slots, while further clockwise rotation of the knob as it is released will allow plate 808 to enter the narrowed front portion of the selected slot and will allow greater rightward travel of knob 805 to completely retract pin 804 from the worm. Each of the slots associated with the various hole sizes is similarly provided with intermediate faces and thus it will be seen that pin 804 is always withdrawn from the worm slots with the final rotation of the pin being in a direction to move arm 710 and cutter 720 outwardly, i.e., toward a larger hole size, thereby insuring that the effect of any backlash or play in the adjustment mechanism always acts in the same direction, and is taken out by the final rotation of pin 804 rather than by the forces first applied to cutter 720 after drilling begins. It will be apparent at this point that the use of slots 717 in worm gear cooperating with transverse pin 804 in shaft 803 is only one of many different types of rotatable drive connections which may be made between the adjusting shaft and the worm, and that practically any type of drive used to turn screws or bolts may be substituted.

Figure 3:
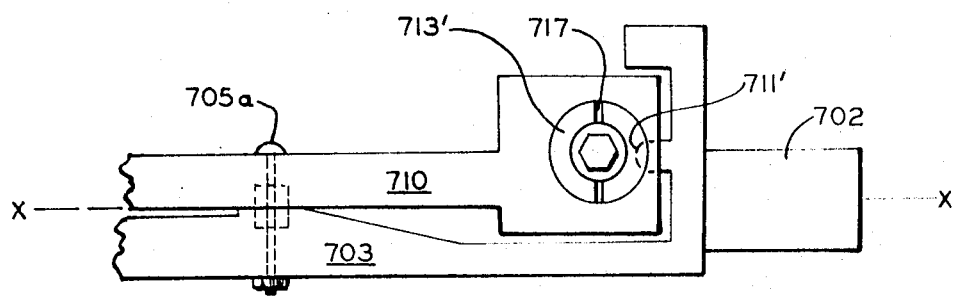
FIG. 3 is a side view of a portion of an alternative embodiment.

One possible modification of the drill which will become apparent to those skilled in the art as a result of this disclosure is shown in semidiagrammatically in FIG. 3. While the preferred embodiments of FIGS. 1a and 1b carries the worm on axial arm 703 and the cooperating gear segment on pivot arm 710, a reversal of parts is shown effected in FIG. 3, with worm 713' carried on the rear end of pivoting arm 710 and gear segment teeth 711' carried on axial arm 703. Various parts of the device of FIG. 3 otherwise are given numerals corresponding to like parts in FIGS. 1a and 1b.

Figure 4:
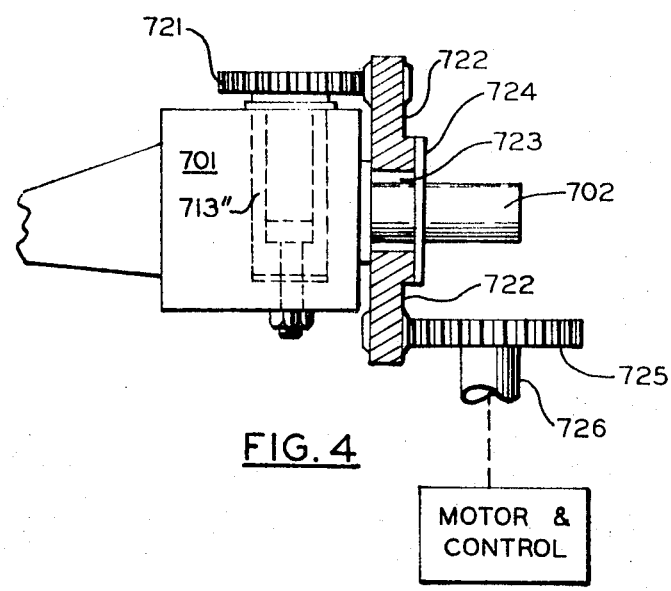
FIG. 4 is a side view of a portion of another embodiment, with certain parts shown in cross section.

Another possible modification is illustrated semidiagrammatically in FIG. 4, wherein the adjustable drill corresponds to the embodiment of FIGS. 1a and 1b, except that worm gear 713', rather than being provided with drive slots 717 inside barrel 701, extends outside barrel 701 and carries pinion 721, which meshes with gear 722, the latter being slidingly mounted on shaft portion 702 by means of bearing 723. Snapring 724 fits in a groove in shaft 702 and keeps gear 722 in pinion with pinion 721. A further pinion 725 also engages gear 722. Assume that shaft 702 is driven at a given speed by a drive motor (not shown). If pinions 721 and 725 have the same number of teeth, i.e., the same diameter as each other, and if shaft 726 is unrestrained, it will be apparent that shaft 726 will be rotated at the same speed as shaft 702. If shaft 726 is temporarily restrained or braked, however, it will be seen that gear 722 will rotate pinion 721 and worm 713", thereby changing the hole-size adjustment in one direction. Conversely, if pinion 726 is temporarily accelerated, gear 722 will rotate pinion 721 so as to adjust the hole size in the opposite direction. A variety of different motor control circuits may be utilized to control shaft 726 so as to increase or decrease the speed of shaft 726 relative to shaft 702, and thereby allow the hole size to be varied as drilling progresses, to provide internally tapered holes, for example, including outwardly tapering holes, which cannot be drilled at all by using an ordinary drill. It will become apparent that pinions 721 and 725 in practice need not be the same, and their ratio may be taken into account in determining the speed of shaft 726 relative to that of shaft 702.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawings shall be interpreted as illustrative and not in a limiting sense.

The embodiments of the invention in which an exclusive property or privilege is claimed are defined as follows:

1. Adjustable drilling apparatus, comprising, in combination: an elongated rigid first arm having a pivot point intermediate its ends; means attached to a first end of said first arm for rotating said first arm around a drilling axis; first cutter means attached to the second end of said first arm, an elongated rigid second arm having a pivot point intermediate its ends, said first and second arms being pivotally connected together at their respective pivot points to pivot about a pivot axis; second cutter means attached to the first end of said second arm; a worm gear-gear segment connection interconnecting the first end of said arm and the second end of said second arm to adjust the position of said first end of said first arm relative to said second end of said second arm, thereby fixing the radial position relative to said drilling axis of said second cutter means from said first cutter means and preventing centrifugal force and forces imparted to said cutter means by a workpiece being drilled from varying said radial position; and means for rotatably adjusting said worm gear of said worm gear-gear segment connection to selectively vary the radial position relative to said drilling axis of said second cutter means from said first cutter means.

2. Apparatus according to claim 1 in which said worm gear-gear segment connection comprises a gear segment carried on the second end of said second arm, and a threaded worm carried on said first arm adjacent the first end thereof, said worm being mounted to be adjustably rotatable and to engage said gear segment.

3. Apparatus according to claim 1 in which said worm gear-gear segment connection comprises a gear segment carried adjacent the first end of said first arm, and a threaded worm carried on said second arm adjacent the second end thereof, said worm being mounted to be adjustably rotatable and to engage said gear segment.

4. Apparatus according to claim 1 in which said first cutter means includes a tip situated on said drilling axis and a pair of cutting edges symmetrically disposed on opposite sides of said drilling axis.

5. Apparatus according to claim 1 in which portions of said first cutter means extends further outwardly along said drilling axis than any portion of said second cutter means at any position of pivotal adjustment of said second arm relative to said first arm.

6. Apparatus according to claim 1 in which said second cutter means includes a cutting edge having an arcuate profile in a plane perpendicular to the axis of the pivotal connection between said first and second arms.

7. Apparatus according to claim 1 having friction means for opposing rotation of said worm gear relative the arm upon which it is mounted.

8. Apparatus according to claim 1 in which said pivot points on said first and second arms are located on said drilling axis.

9. Apparatus according to claim 1 in which said first and second arms include pairs of flat surfaces which abut each other in a plane perpendicular to the axis of pivotal connection and passing through said drilling axis.

10. Apparatus according to claim 1 in which said first cutter means includes a tip on said drilling axis and a pair of guiding edges symmetrically disposed on opposite sides of said drilling axis and extending parallel to said drilling axis.

11. Apparatus according to claim 1 in which said worm gear is mounted to be adjustably rotatable about its axis and constrained against axial movement relative to the arm upon which it is mounted.

12. Apparatus according to claim 1 in which said means for adjusting said worm gear includes index means, a reciprocable shaft having an end adapted to engage and rotate said worm gear, and means for rotating said reciprocable shaft relative to index means.

13. Apparatus according to claim 1 in which said means for rotating said worm gear includes a pinion connected to rotate said worm gear, and means for rotating said pinion.

14. Apparatus according to claim 1 in which a portion of said worm gear has a diameter varying substantially in accordance with its distance from the pivotal connection of said pivot points of said arms.

15. Apparatus according to claim 1 in which the first end of said first arm and the second end of said second arm include cooperating stop means to limit the pivotal movement of said second arm relative to said first arm.

16. Apparatus according to claim 1 having stop means to limit the pivoting of said second arm relative to said first arm at a first pivot position in which all cutting edges of said second cutter means lie radially within the cutting edges of said first cutter means, and at a second pivot position in which a portion of the cutting edges of said second cutter lies radially outside one of the cutting edges of said first cutter means.

17. Apparatus according to claim 2 in which the first end of said first arm includes a cylindrical barrel portion concentric with said drilling axis and said threaded worm is adjustably rotatable and axially fixed within a cylindrical bore within said barrel portion, said bore extending parallel to a plane which is normal to the axis of the pivotal connection between said first and second arms.

18. Apparatus according to claim 4 in which said second cutter means comprises a truncated cone.

* * * * *